United States Patent
Rogers et al.

(10) Patent No.: US 9,129,147 B1
(45) Date of Patent: Sep. 8, 2015

(54) OPTIMAL AUTOMATIC CAPTURE OF FACIAL MOVEMENTS AND EXPRESSIONS IN VIDEO SEQUENCES

(71) Applicant: Image Metrics Ltd., Manchester (GB)

(72) Inventors: Michael Rogers, Manchester (GB); Kevin Walker, Sheffield (GB); Tomos G. Williams, Rhuthun (GB); Martin De La Gorce, Manchester (GB); Martin Tosas, Manchester (GB)

(73) Assignee: Image Metrics Limited, Manchester (GB)

( * ) Notice: Subject to any disclaimer, the term of this patent is extended or adjusted under 35 U.S.C. 154(b) by 303 days.

(21) Appl. No.: 13/795,154

(22) Filed: Mar. 12, 2013

Related U.S. Application Data

(60) Provisional application No. 61/650,137, filed on May 22, 2012.

(51) Int. Cl.
    *G06K 9/00* (2006.01)

(52) U.S. Cl.
    CPC .................................. *G06K 9/00268* (2013.01)

(58) Field of Classification Search
    CPC .......... G06K 9/00221; G06K 9/00261; G06K 9/00281; G06K 9/00335; G06T 7/20; G06T 7/2033; G06T 2207/20072; G06T 2207/30201
    See application file for complete search history.

(56) References Cited

U.S. PATENT DOCUMENTS

| | | | |
|---|---|---|---|
| 5,659,625 A | 8/1997 | Marquardt | 382/118 |
| 5,854,850 A | 12/1998 | Linford et al. | 382/128 |
| 5,933,527 A | 8/1999 | Ishikawa | 382/190 |
| 6,091,836 A | 7/2000 | Takano et al. | 382/118 |
| 6,396,599 B1 | 5/2002 | Patton et al. | 359/1.9 |
| 6,502,583 B1 | 1/2003 | Utsugi | 132/200 |
| 6,719,565 B1 | 4/2004 | Saita et al. | 434/94 |
| 7,619,638 B2 | 11/2009 | Walker, Jr. et al. | 345/629 |
| 7,634,103 B2 | 12/2009 | Rubinstenn et al. | 382/100 |
| 7,916,904 B2 | 3/2011 | Suzuki et al. | 382/118 |
| 8,064,648 B2 | 11/2011 | Takano et al. | 382/117 |
| 8,082,926 B2 | 12/2011 | Yano et al. | 132/200 |
| 8,107,672 B2 | 1/2012 | Goto | 382/100 |
| 8,498,456 B2 | 7/2013 | Legagneur et al. | 382/118 |

(Continued)

OTHER PUBLICATIONS

Cham et al., "A Multiple Hypothesis Approach to Figure Tracking," *Compaq Computer Corporation*, Cambridge Research Laboratory, Technical Report Series, CRL 98/8, 16 pages (Jul. 1998).

(Continued)

*Primary Examiner* — Andrew W Johns
(74) *Attorney, Agent, or Firm* — Sunstein Kann Murphy & Timbers LLP

(57) ABSTRACT

Computerized methods for creating tracks of locations across frames of a video corresponding to a facial feature of a human. A set of feature location hypotheses is generated, as applied to images derived from the sequence of frames representing images of the human. Each hypothesis is refined, and a first set of confidence measures is associated with each hypothesis. A second set of confidence measures is associated with interframe transition, and a cost function that is a combination of hypotheses and transition confidence measures is minimized. A set of tracks is generated, characterizing each of a plurality of facial features within each frame of the sequence of frames. Performance analysis data may further be derived in a performance driven animation production pipeline, based on the generated tracks.

4 Claims, 5 Drawing Sheets

(56) References Cited

U.S. PATENT DOCUMENTS

| | | | |
|---|---|---|---|
| 2003/0012408 A1* | 1/2003 | Bouguet et al. | 382/103 |
| 2010/0271368 A1 | 10/2010 | McNamara et al. | 345/420 |
| 2011/0110561 A1 | 5/2011 | Havaldar | 382/103 |

OTHER PUBLICATIONS

Chen et al., "Mode-based Multi-Hypothesis Head Tracking Using Parametric Contours," *In Proc. Autom. Face Gesture Recognit.*, 6 pages (May 2002).

Gao et al., "A Review of Active Appearance Models," *IEEE Trans. Syst. Man Cybern. C Appl. Rev.*, vol. 40, No. 2, pp. 145-158 (Mar. 2010).

Liao et al., "Learning Multi-scale Block Local Binary Patterns for Face Recognition," Center for Biometrics and Security Research & National Laboratory of Pattern Recognition, Institute of Automation, Chinese Academy of Sciences, pp. 828-837 (2007).

Prabhu et al., "Automatic Facial Landmark Tracking in Video Sequences using Kalman Filter Assisted Active Shape Models," *ECCV '10 Proceedings of the 11th European conference on Trends and Topics in Computer Vision*—vol. Part I, 14 pages (2010).

* cited by examiner

OPTIMAL AUTOMATIC CAPTURE OF FACIAL MOVEMENTS AND EXPRESSIONS IN VIDEO SEQUENCES

The present application claims the priority of U.S. Provisional Patent Application Ser. No. 61/650,137, filed May 22, 2012, and incorporated herein by reference.

TECHNICAL FIELD

The present invention relates to automation of performance analysis, and, more particularly, to optimal tracking of facial features in a temporal sequence of images.

BACKGROUND ART

Facial expression measurement has become extremely valuable in numerous fields such as performance-driven facial animation in media production, behaviour analysis, cognitive studies, product design analytics, and measuring emotional responses to advertising.

Methods heretofore developed for measuring facial expressions are typically limited to professional applications and capture scenarios insofar as they require constrained capture environments, specialized hardware, trained operators, physical facial markers and long setup times. These requirements make such technologies impractical for some professional and most consumer applications.

For example, media producers are continually striving to provide more life-like appearance to their digitally generated characters, particularly in the challenging field of creating realistic facial animation. One common method of achieving this is to capture the visual performance of an actor, in addition to their voice, in order to transfer the facial movements and expressions onto the digital character to coincide with the sound track. Currently, this requires a highly skilled animator with the ability to identify the multiple movements of the performer's face which form the speech and expressions, and map them onto a complex set of animation controls of the digital character. Due to the highly specialized, and time-consuming, task of interpreting and transferring often subtle facial movements onto a digitally animated character, this technique has traditionally been restricted to large production motion pictures and high-end video games.

Approaches have been developed to provide some level of automation for performance capture, in particular, in identifying and encoding the movements of specific facial locations within the performer's face.

Existing commercial approaches aimed at performance capture of actors in animation production use specialized performance capture environments to increase the reliability by with which movements can be detected. One example of such an approach includes placing physical markers, designed to be easily identifiable and accurately located by the vision system, on the performer's face, as described in US Patent Application 2011/0110561, to Havaldar, entitled "Facial Motion Capture Using Marker Patterns That Accommodate Facial Surface," and incorporated herein by reference. Another approach uses multiple cameras, as described in US Patent 2010/0271368 A1, McNamara et al. "Systems and Methods for Applying a 3d Scan of a Physical Target Object to a Virtual Environment," which is also incorporated herein by reference. These approaches are able to locate facial features accurately, however, they also increase the skill level, set-up times and costs required during capture.

Other more generic approaches of locating facial features in video sequences include various statistical models of shape and appearance which have been proposed for use in without requiring specialized capture environments or placement of optical marker to be placed on a face, as described, for example, by Gao, et al., "A review of active appearance models," *Trans. Sys. Man Cyber Part C*, vol. 40(2), pp. 145-58, (2010), 145-158, incorporated herein by reference. Such statistical treatments model the position and appearance of facial features from a training set of images, and, when applied to new images, find the combination of feature locations which best fit the model. Deficiencies of these approaches include the fact that each frame of the video sequence is processed in isolation, resulting in a series of feature location solutions which may jump from one frame to the next.

Other classes of solutions augment the statistical models of shape and appearance with temporal models. An example of this type of method is described by Prabhu et al., "Automatic Facial Landmark Tracking in Video Sequences using Kalman Filter Assisted Active Shape Models," *Proceedings of the Third Workshop on Human Motion in Conjunction with the European Conference on Computer Vision* (ECCV '10), (2010), incorporated herein by reference. Prabhu, et al. use a Kalman filter to provide an estimation of the position of the facial features in the next frame, given their positions in all previous frames, and then use an ASM to update this initial estimation. This approach, like kindred methods in the literature, uses the temporal information only in the forward direction, to improve the estimation of the next frame, and cannot be retrospectively detect and correct tracking errors which may have occurred in the previous frames. Such unidirectional temporal models are subject to drifting, and are not capable of avoiding being drawn towards local minima in the solution space.

In prior work on multi-hypothesis feature tracking, for each feature, multiple potential matches are identified in each frame, as described, for example, by Chen et al., "Mode-based Multi-Hypothesis Head Tracking Using Parametric Contours," *Proc. Fifth IEEE Int. Conf. on Automatic Face and Gesture Recognition*, pp. 112-17 (2002), and by Cham, et al., "Multiple hypothesis approach to figure tracking," *Proc. IEEE CVPR*, vol. 2, pp. 239-45, (1999), which are incorporated herein by reference. Previous approaches, however, provide only the location and estimated orientation of the whole face, and cannot track individual features within the face to enable expression encoding and transfer to animated characters.

SUMMARY OF EMBODIMENTS OF THE INVENTION

In accordance with various embodiments of the present invention, multiple hypotheses are provided for the location of key facial features, such as eye corners or lip corners, in each frame of the video. Each hypothesis in each frame is refined to increase the accuracy of estimated feature locations. The optimal refined hypothesis for each frame is selected by combining information on three aspects of the facial features to determine the optimal path through the hypotheses across the complete video sequence.

In accordance with a preferred embodiment, a computerized method is provided for tracking specified locations, each location corresponding to a facial feature of a human, across a sequence of frames of a video sequence. The method has steps of
 a. generating a set of feature location hypotheses applied to images derived from the sequence of frames representing images of the human;
 b. refining each hypothesis;

c. associating a first set of confidence measures with each hypothesis;

d. associating a second set of confidence measures with interframe transitions;

e. minimizing a cost function that is a combination of hypotheses and transition confidence measures; and f. generating a set of tracks characterizing each of a plurality of facial features within each frame of the sequence of frames.

In accordance with alternate embodiments of the present invention, confidence measures associated with interframe locations are represented by vertices of a connected, undirected graph, and confidence measures associated with interframe transitions are represented by edges in the connected, undirected graph.

In other embodiments of the present invention, performance analysis data in a performance driven animation production pipeline are created on the basis of the generated tracks.

In a further embodiment of the present invention, a non-transitory computer readable medium is provided for use on a computer system and for storing computer-readable program code. The computer readable program code has:

a. a computer code module for generating a set of feature location hypotheses applied to images derived from a sequence of frames representing images of the human;

b. a computer code module for refining each hypothesis;

c. a computer code module for associating a set of confidence measures with each hypothesis;

d. a computer code module for minimizing a cost function that is a combination of hypotheses and transition confidence measures; and e. a computer code module for generating a set of locations characterizing each of a plurality of facial features within each frame of the sequence of frames.

BRIEF DESCRIPTION OF THE FIGURES

The foregoing features of the invention will be more readily understood by reference to the following detailed description, taken with reference to the accompanying figures, in which.

DETAILED DESCRIPTION OF EMBODIMENTS OF THE INVENTION

Definitions

Figure 1:
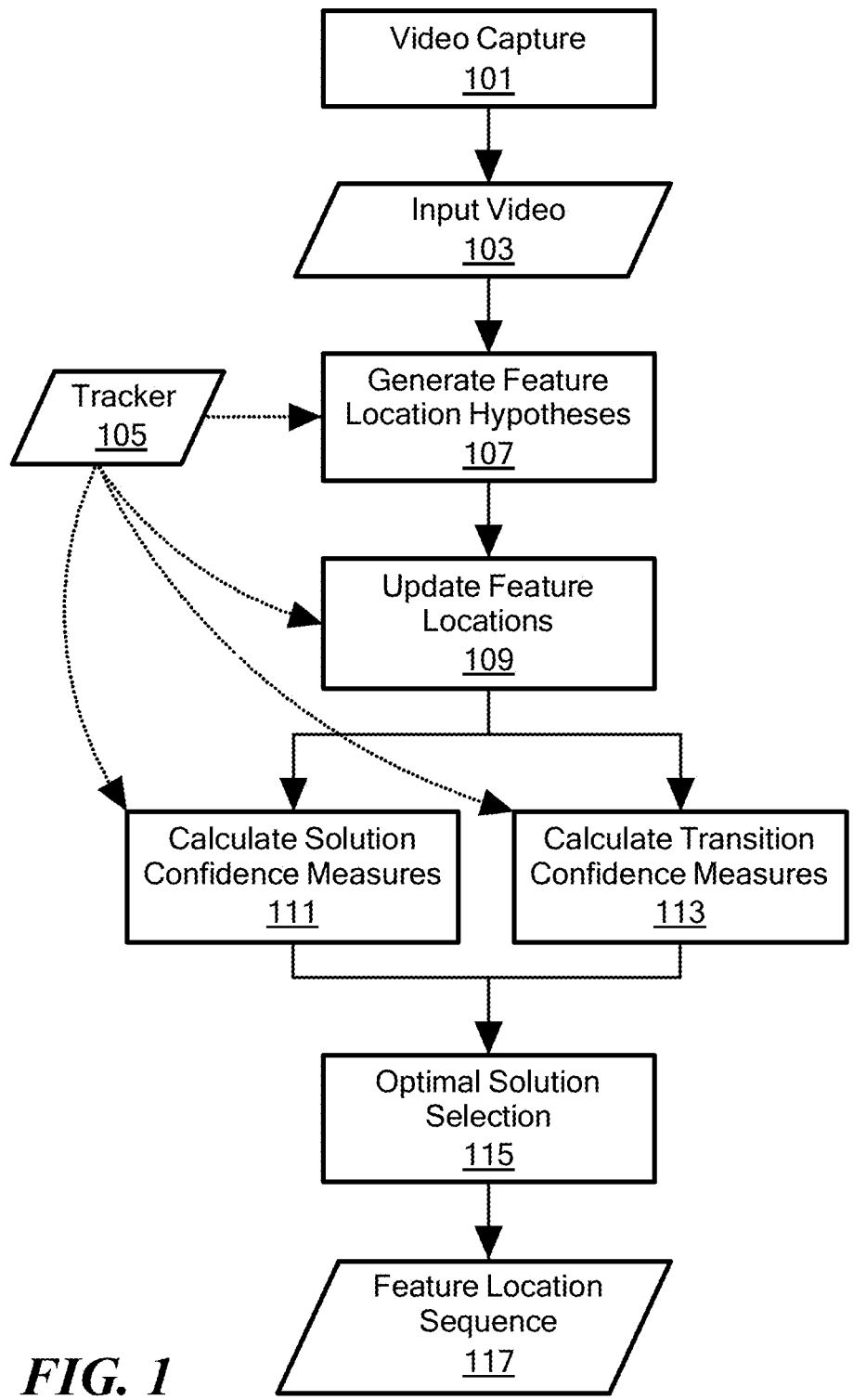
FIG. 1 is a flow chart depicting a method of optimal automatic facial feature capture in accordance with embodiments of the present invention.

As used in this description and in the appended claims, the term "image" refers to any multidimensional representation, whether in tangible or otherwise perceptible form or otherwise, whereby a value of some characteristic is associated with each of a plurality of locations corresponding to dimensional coordinates of an object in physical space, though not necessarily mapped one-to-one thereonto. Thus, for example, the graphic display of the spatial distribution of some feature, such as brightness, constitutes an image. So, also, does an array of numbers in a computer memory or holographic medium. Similarly, "imaging" refers to the rendering of a stated physical characteristic in terms of one or more images. An image, when constituting one of a series, may be referred to as a "frame."

A "video" refers to a sequence of images (defined above), or "frames," where a "frame" is an image comprising one of a sequence of images. The terms "video" and "video sequence" may be used interchangeably.

A "track" refers to a time series of points in successive frames of a video wherein all points in a track are associated with an identical feature of a physical object, which may include a living creature or person.

Overview

By adhering to teachings of the present invention laid out below, one is taught how automatically to capture and encode the facial movements of a performer as embodied in an input video. Embodiments of the present invention employ a statistical model of the expected appearance and relative positions of facial features to determine likely locations of the features in each frame of the input video, and, furthermore, use information on the likely movement of each feature between adjacent frames to determine the trajectory of each feature over the whole video sequence.

In accordance with the teachings provided below, an optimal set of solutions may be obtained for the precise location of facial features in a video sequence by analyzing the sequence as a whole. In addition to the relative position and appearance of facial features, statistical models in accordance with the present invention use information on the likely distribution of temporal changes in these features, in both the forward and reverse directions, between frames. This information is formulated within a graph structure to enable the optimal sequence of solutions for the whole frame to be found. The result is a method which is robust to local solution space minima, and a method that is able to deal with large inter-frame differences in cases where there are rapid movements or expression changes.

Embodiments of the present invention may provide a significant improvement over prior approaches in that they may accurately and robustly track the optimal path for a set of facial features throughout an entire input video sequence. This is achieved by a novel combination of hypothesis generation, refinement and selection. Multiple hypotheses for the position of each facial feature are generated using information about the statistics of a training set and are refined to increase accuracy in each frame of input video. An optimal path through this refined hypothesis set is calculated using a graph structure formulation together with a novel weighting measure which combines a confidence for each hypothesis within each frame with a measure of the expected inter-frame transition from one hypothesis to the next. This results in the selection of an optimal solution for the location of each facial feature in each frame of the tracked video. The result is a fully automated system, capable of providing accurate and detailed information on the location of facial features from a video of an individual's performance, which can be used to aid the creation of realistic facial animation.

DESCRIPTION OF EMBODIMENTS

Methods in accordance with embodiments of the present invention are now described with reference to the flow chart depicted in FIG. 1. A video capture system 101, typically including a monocular digital camera, produces a video depiction of the image over time of the face of a human.

The human whose face 200 (shown in FIG. 2) is imaged may be referred to, herein, as the "actor," and the behavior of the human over time may be referred to herein and in any appended claims as a "performance". No special requirements are made as to lighting, or to markers on the face of the actor. One or more of the frames may contain additional matter, and features of the face may be occluded in whole or in part in some portion of the frames, within the scope of the present invention.

Analysis in accordance with methods of the invention, as herein described and claimed, may be performed on a proper subset, or on the entirety, of the sequence of frames constituting a video sequence. In some instances, video capture system 101 is applied at one location and time, creating an input video 103 subsequently used as input for application of methods in accordance with the present invention.

Input video 103 may be stored off-line in a storage device 604 and may be analyzed by a processor 607 collocated with storage device 604 or otherwise, within the scope of the present invention. In some embodiments, processor 607 may operate on a range, or on ranges, of frames, as may be specified by an operator. Typically, processor 607 extracts each frame and saves it to a memory device 604, however this operation is not necessary for practice within the scope of the present invention as claimed.

Tracker 105 contains information on the precise locations of facial features in a large set of previously analyzed video sequences.

As used herein, the term "facial feature" shall refer to unique, salient features which, ideally, are present throughout the entire data set. More particularly, a "feature" shall refer to a locus of one or more points $\{(x_i, y_i)\}$ within an image distinguished from surrounding points in a manner that allows for its tracking across frames of a video sequence.

Figure 2:
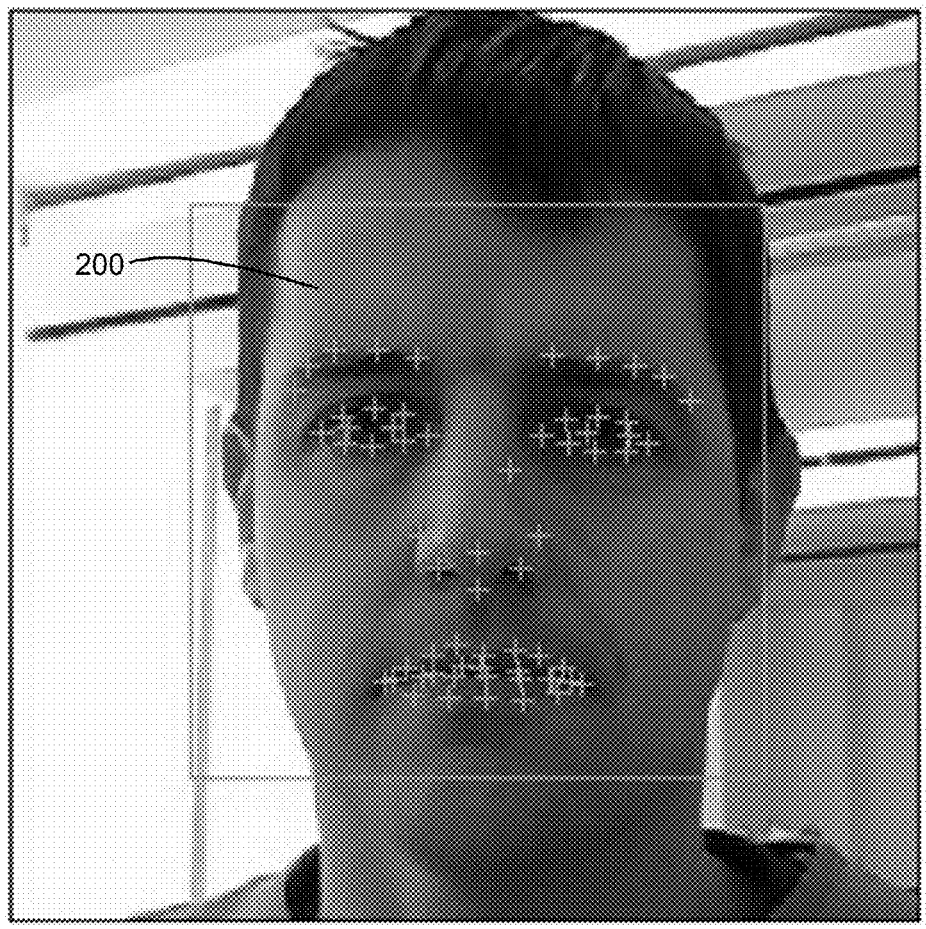
FIG. 2 shows a face in a single frame of video, the result of a face-detection box, and a set of feature positions, in accordance with embodiments of the present invention. Sets of feature positions of this type are referred to herein as a "hypothesis."

Insofar as the image contains a face, a feature such as the one defined above may be referred to as a "facial feature." Examples of facial features can include, but are not restricted to; left-eye-outer-corner, right-nostril-outer-corner, lip-top-outer-middle. Each frame of input video 103 shall be said to contain an identical set of facial features, which, collectively, shall be referred to as "the set of facial features". The set of facial features are assumed to track from any one frame to any other frame, within the scope of the present invention. FIG. 2 shows a face in a single frame of video, the result of a face-detection box, and a set of feature positions, in accordance with embodiments of the present invention. Sets of feature positions of this type are referred to herein as a "hypothesis."

In accordance with preferred embodiments of the invention, the position of each facial feature is described by its x and y position in each frame of the training images. The set of facial features for each frame can be described as a vector, $X = \{x_1, x_2, \ldots, x_n, y_1, y_1, \ldots, y_n\}$, where $\{x_i, y_i\}$ are the 2D coordinates of the point associated with the facial feature i.

The information contained within tracker 105 is used where described herein, but may also be used in other steps without straying from the scope of the present invention. In particular, and without limitation, information contained within tracker 105 may be used:

a. to determine (in step 107) the possible positions of the features in each frame of the input video, thus generating multiple possible solutions, or hypotheses, for a configuration of all the facial features for each frame;

b. to iteratively refine (109) any hypothesis within a given frame using an update model, also contained within tracker 105, as described in detail below; and c. to assign a confidence measure (111) for each hypothesis based on knowledge of the position and appearance of features in the training set of images.

In step 107, Tracker 105 is used to generate one or more hypotheses, each of which defines an initial location for the set of facial features pertaining to a particular frame.

As part of the hypothesis generation step 107, a face detection method, such as that proposed by Liao, et al., in "Learning Multi-scale Block Local Binary Patterns for Face Recognition," *International Conference on Biometrics (ICB),* LNCS 4642, pp. 828-837, (2007), incorporated by reference herein, or any other face detection method, is applied to provide a rectangular box in the image within which the face is most likely to reside. The rectangular box is referred to, herein, as a "face detection box." Each face detection box is described (for heuristic purposes, in the present description) by the 2D coordinates of the corner nearest the image origin, and by its width and height, although the rectangle may be otherwise described, as by a diagonal and an angle relative to a fiducial axis, for example, within the scope of the present invention. As used herein, the term "image origin" shall refer to a fiducial point arbitrarily defined for each frame. An affine alignment transform, T, is then defined from each face detection box vector as $$T = \begin{bmatrix} 1/w & 0 \\ 0 & 1/h \end{bmatrix} \begin{bmatrix} -x \\ -y \end{bmatrix},$$

where $\{x, y\}$ are the 2D coordinates of the corner nearest the image origin and w and h are the width and height of the face detection box, respectively.

The set of features in each frame of each training video are aligned according to a common reference defined by the transformed face detection box $X' = T(X)$. The tracker contains a set of m initial location hypotheses for the position of the set of facial features aligned according to the face detection box transform.

In accordance with one embodiment of this invention, initial location hypotheses are chosen to encapsulate the variation in dimensions of people's facial features and the range of motion of the features typical in a sequence of an actor's performance. The mean of all aligned sets of features in the training images is chosen as the first hypothesis. Next, the aligned, training image example furthest away, as defined by the geometric distance measure, is added as the second hypothesis. Then, for m−2 iterations, the minimum geometric distance between all remaining examples, and those already included in the hypothesis set is calculated, and the example furthest away from all existing hypotheses is added to the set, until the hypothesis set is populated with m examples which encapsulate the set of expression variation present in the training set.

During tracking, each frame in turn is first analyzed using a face detection system, identical to the one used in aligning the set of features in the training images. This provides a rectangular box in the image which the tracker 105 uses to define the location of the initial hypotheses. Each hypothesis defines the location of a set of facial features in the current frame.

At this point, we define the term "update model." Given an initial set of feature locations in an image which may not lie on the desired physical locations, an "update model" will predict the direction and magnitude of an update step that will move the feature locations closer to the desired physical locations. Iterating this process will move the feature locations progressively closer to the desired result until convergence.

In step 109, the Tracker's update model, as previously defined, is used to iteratively improve each feature location hypothesis independently. For each hypothesis, image samples are taken at locations defined by the starting locations of the facial features, and used as inputs to the update model. The update model produces a vector of offsets which, when applied to the current feature locations, move them to a better estimation of the feature locations in each frame. The update model is applied iteratively for a pre-defined number of iterations, limited by the time interval required to achieve real-time tracking of the input images.

In one embodiment of the invention, an Active Appearance Model, as described in Cootes et al., "Active Appearance Models," ECCV98, pp. 484-98 (1998), incorporated herein by reference, is used as an update model, though other update models may be used within the scope of the present invention.

As used herein, the term "Solution Confidence Measure" shall mean a measure calculated to reflect the confidence with which the appearance of a set of facial features, as defined within a frame, are representative of those present in the training images. Given multiple hypotheses for the feature locations in each frame, a value is assigned (in step 111) to each hypothesis, indicating the likelihood that that is the correct solution. In the preferred embodiment of this invention, the Tracker is used to assign a confidence measure to each solution. The tracker contains an appearance model such as one described in Gao et al., "A Review of Active Appearance Models," *IEEE Trans. on Systems, Man, and Cybernetics—Part C: Applications And Reviews*, 40(2), pp. 145-58 (2010), incorporated herein by reference. The appearance model captures the appearance of facial features in the training images using a Principle Component Model of the texture, as fully described in Gao, et al. (2010). The texture is projected onto the texture subspace based on Principle Component Analysis (PCA):

$$g = g_0 + P_g b_g$$

where $g_0$ denotes the mean texture, $P_g = \{g_i\}$ is the matrix consisting of a set of orthogonal base vectors $g_i$ and describing the modes of variation derived from the training set, and $b_g$ includes the texture parameters in the texture subspace, thus providing a compact description of the variation in the texture of the facial features in the training image.

Each hypothesis in a frame defines a set of facial feature points, from which a texture vector is sampled. A measure of how well each hypothesis' texture vector correlates with the tracker's appearance model is calculated. $t_c$ is the sampled texture vector from one hypothesis. This is projected to the texture model frame, and $t_m$ is the texture vector generated by the model. The similarity between the original and model texture vectors may be calculated using the Pearson's correlation, $C_g = \text{corr}(t_c, t_m)$, and interpreted as the solution confidence measure for that hypothesis.

As used herein, the term "Transition Confidence Measure" shall mean a measure calculated to reflect the confidence with which a transition between a set of facial features in one frame and a set of facial features in either a preceding or the next frame is likely given the expected movements of facial features and expected change in appearance between adjacent frames in a video sequence. In accordance with embodiments of the invention, the knowledge is applied that the sequence of correct solutions will only differ in a manner consistent with statistics gathered from a set of training data. These statistics relate to changes in position, shape and/or appearance between adjacent frames. For each pair of hypotheses in adjacent frames, a transition confidence measure is computed (in step 113).

Various measures for the distance between any pair of solutions may be used as the basis for the transition confidence measure (113). In one embodiment of the invention, this measure is computed as the mean Euclidean distance $D_{a,b} = \|X_a - X_b\|$ between the features of any two solutions, although any reasonable norm may be used as the requisite measure, within the scope of the present invention.

In accordance with another embodiment of the present invention, the root-mean-square of the difference in the values of the appearance parameters, $D_{a,b} = \|A_a - A_b\|$ for each pair of solutions may be computed and used as the measure of transition confidence. In yet another embodiment of the invention, statistics on the likely changes in position, shape and/or appearance of features may be gathered from the training data, and used by the Tracker to compute the statistical likelihood of each transition occurring.

Optimal Solution Selection

Given a number of possible solutions for the position of the facial features in each frame in a video sequence, a confidence measure for each of these, and a transition confidence measure for the likelihood of each solution being proceeded and followed by all of the solutions in the previous and next frames respectively, all of these measures are combined in step 115, and the optimal sequence of solutions is computed.

In accordance with preferred embodiments of the invention, a connected, undirected graph is constructed, with the vertices representing each hypothetical solution for each frame, and edges between all vertices in adjacent frames. The solution and transition confidence measures are normalized to be in the range [0,1].

The vertices are assigned values equivalent to the one minus the normalized solution confidence measures, $V_a = 1 - \|C_a\|$, and the edges are assigned a value equal to one minus the transition confidence measures $E_{a,b} = 1 - \|D_{a,b}\|$. The total cost $W_p$ of the path between any two pairs of solutions is calculated as the sum of all vertex values and sum of all edge values weighted by a scaling factor, $\lambda_e$, $$W_p = \sum_{p \in P} V_p + \lambda_e \sum_{p,q \in P} E_{p,q}$$

where P is a vector of a set of solutions, equal in length to the number of frames in the video.

Figure 3A:
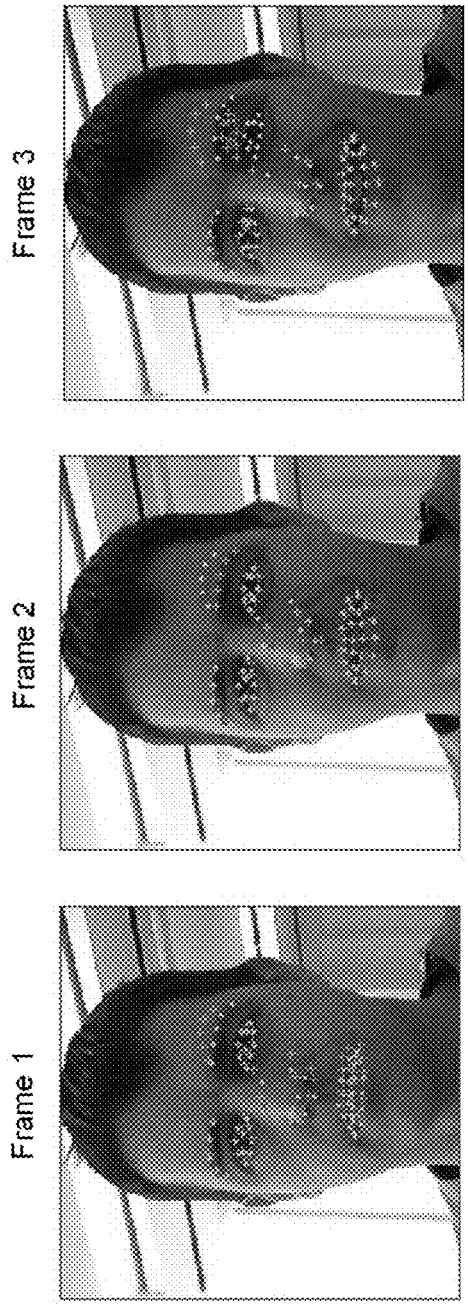
FIG. 3A shows a sequence of three frames, with three color-coded hypothetical solutions in each.
Figure 3B:
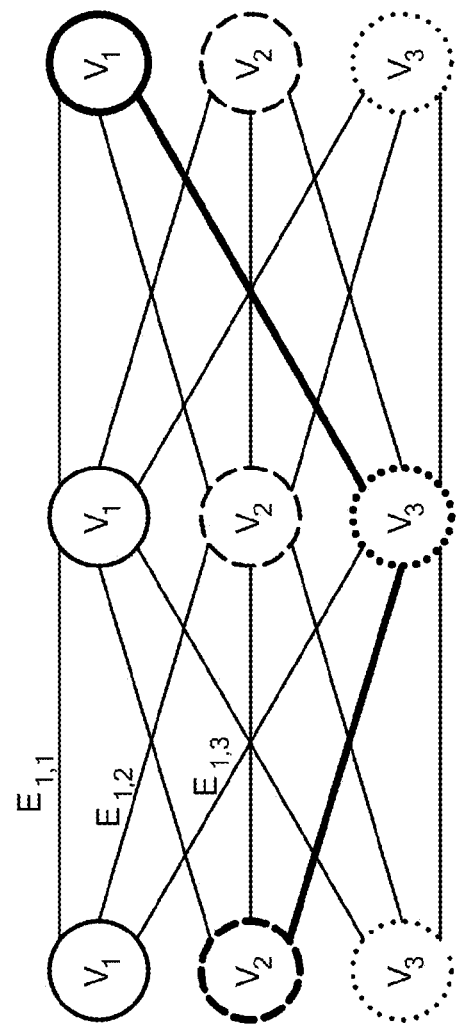
FIG. 3B shows a connected graph with three nodes at each frame, with an associated confidence measure. Bold lines illustrate the optimal path and choice of solutions through the video sequence, in accordance with embodiments of the present invention.

In accordance with embodiments of the present invention, the total cost function is minimized. A shortest path algorithm, such as Dijkstra's algorithm, as listed in Cormen et al. "Introduction to Algorithms" (2d ed., pp. 595-601 (2001), may be used to find a path between all of the solutions in the first frame to all of the solutions in the last frame, and the path with the minimum cost is chosen as the optimal solution path, although any other algorithm maybe used to find this optimal solution within the scope of the present invention. Due to the construction of the graph, this path transverses through exactly one solution per frame, thus defining the optimal sequence of solutions. FIG. 3A shows a sequence of three frames, with three color-coded hypothetical solutions in each, and FIG. 3B shows a connected graph with three nodes at each frame, with an associated confidence measure. Bold lines illustrate the optimal path and choice of solutions through the video sequence, in accordance with embodiments of the present invention.

Feature Location Sequence

The output of the steps heretofore described include a set of locations, one for each facial feature, identifying the precise location of each respective facial feature in each frame of the video sequence. This output feature location sequence 117 is suitable for analysis by an expression measurer or for further encoding to be provided as input to a digital animation system. In accordance with the teachings provided herein, expressions of a physical human actor are transformed into a digital sequence useful for animation or for other purposes.

Performance-Driven Animation Production

Figure 5:
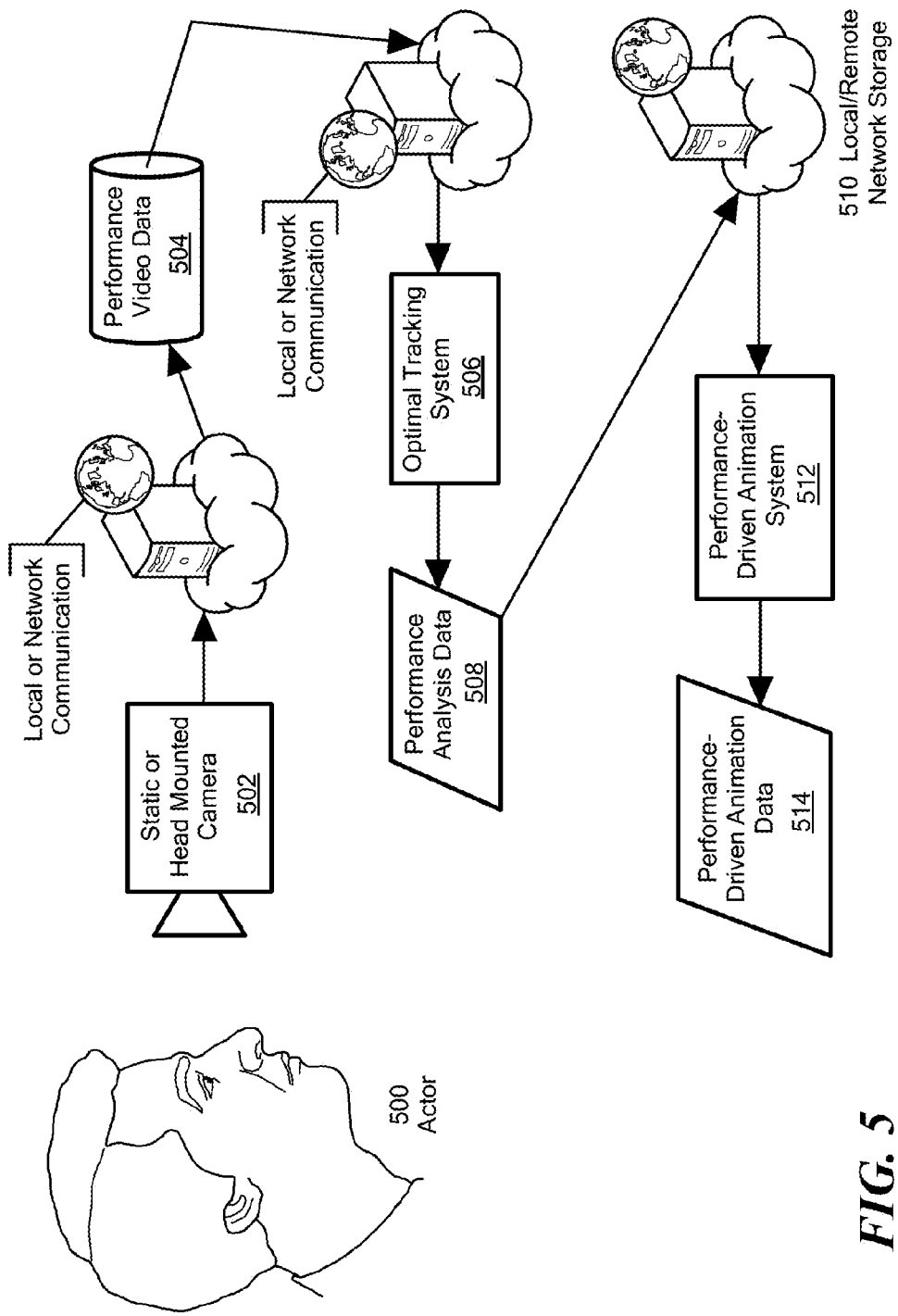
FIG. 5 is a schematic depiction of a performance-driven animation production pipeline where performance analysis data is provided in accordance with an embodiment of the present invention.

One embodiment of the present invention is its use as part of a performance-driven animation production pipeline such as the one shown in FIG. 5. Here the performance of an actor 500 is captured in video form by a helmet or statically mounted camera 502 and saved in an appropriately indexed form as Performance Video Data 504. Sequences of this video data can be recalled from storage and the precise and optimal locations of the actor's facial features can be obtained automatically using a system in accordance with various embodiments of the present invention in module 506. The resulting performance analysis data 508 can be stored and later used as input to a suitable performance-driven animation system 512, such as the one described in U.S. Pat. No. 7,830,384, (Edwards et al., entitled "Animating graphical objects using input video"), which is incorporated herein by reference.

Automation of the performance analysis function in accordance with embodiments of the present invention may advantageously reduce the time requirements of the skilled facial animator.

Various embodiments according to the invention may be implemented on one or more computer systems. These computer systems may be, for example, general-purpose computers. It should be appreciated that systems described herein for capturing facial movements and expressions in video sequences may be located on a single computer or may be distributed among a plurality of computers attached by a communications network.

Figure 4:
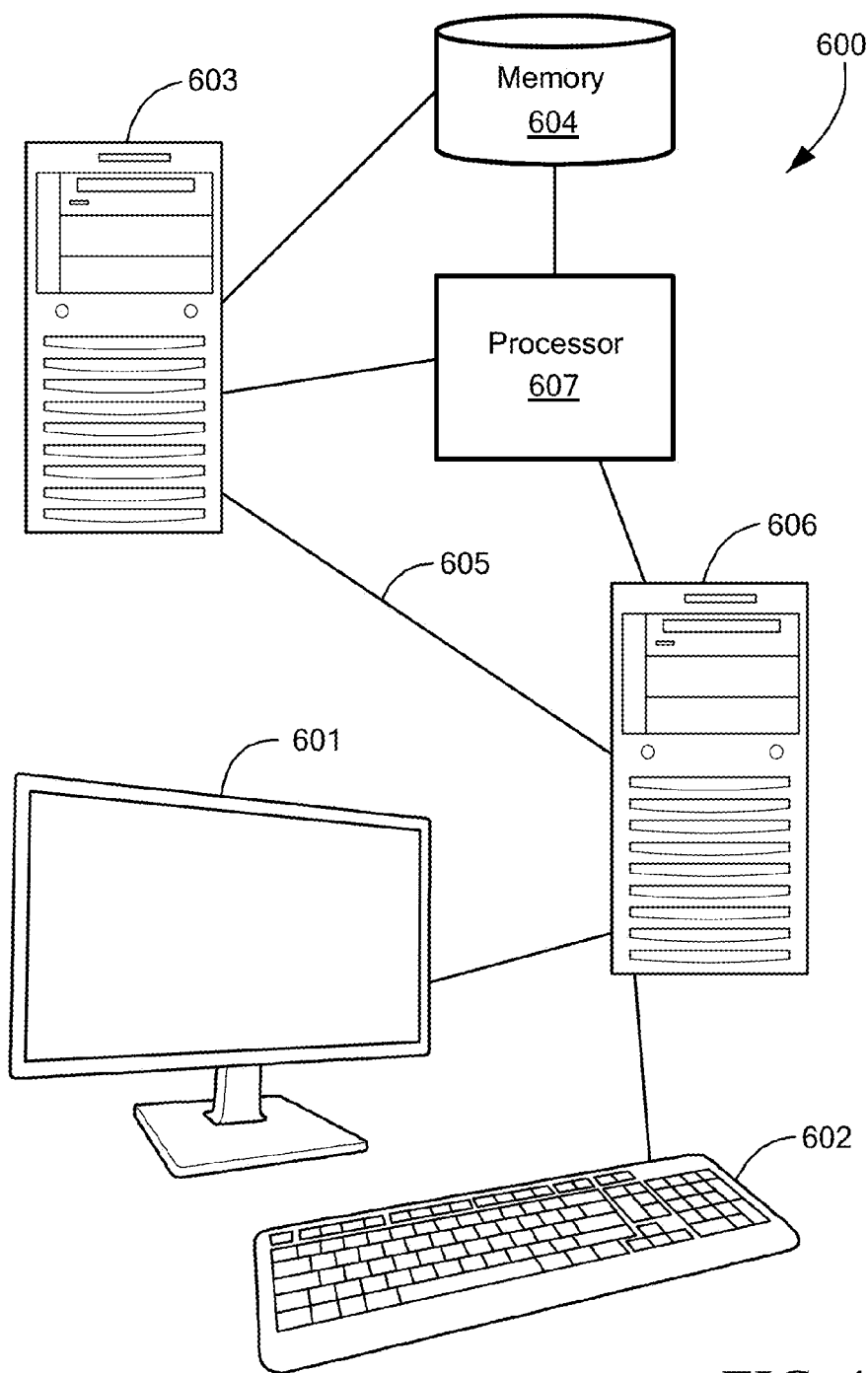
FIG. 4 schematically depicts one embodiment of a system that may be used to implement aspects of the present invention.

Various aspects of the invention may also be implemented as specialized software executing in a general-purpose computer system 600 such as that shown in FIG. 4. The computer system 600 may include a database server 603 connected to one or more memory devices 604, such as a disk drive, memory, or other device for storing data. Memory 604 is typically used for storing programs and data during operation of the computer system 600. Components of computer system 600 may be coupled by an interconnection mechanism 605, which may include one or more busses (e.g., between components that are integrated within a same machine) and/or a network (e.g., between components that reside on separate discrete machines). The interconnection mechanism 605 enables communications (e.g., data, instructions) to be exchanged between system components of system 600. Computer system 600 also includes one or more input devices 602, for example, a keyboard, mouse, trackball, microphone, touch screen, and one or more output devices 601, for example, a printing device, display screen, speaker. In addition, computer system 600 may contain one or more interfaces (not shown) that connect computer system 600 to a communication network (in addition or as an alternative to the interconnection mechanism).

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 600 is shown by way of example as one type of computer system upon which various aspects of the invention may be practiced, it should be appreciated that aspects of the invention are not limited to being implemented on the computer system as shown in FIG. 4. Various aspects of the invention may be practiced on one or more computers having a different architecture or components than that shown in FIG. 4.

Computer system 600 may be a general-purpose computer system that is programmable using a high-level computer programming language. Computer system 600 may be also implemented using specially programmed, special purpose hardware. In computer system 600, servers 603 and 605 are typically implemented on one or more commercially available servers.

Processors 607 and operating systems employed in conjunction with servers 603 and 605 define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate, or interpreted code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, while descriptions have been provided in terms of captur- ing facial movements, they are not limited to this context. The procedures are applicable to a wide variety of tracking problems.

Moreover, where examples presented herein involve specific combinations of method acts or system elements, it should be understood that those acts and those elements may be combined in other ways to accomplish the same objective of automatic capture of facial movements. Acts, elements and features discussed only in connection with one embodiment are not intended to be excluded from a similar role in other embodiments.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Additionally, single device features may fulfill the requirements of separately recited elements of a claim.

What is claimed is:

1. A computerized method for creating a video stream retained in a non-volatile medium and a set of non-transitory tracks, each track comprising a plurality of specified locations appearing in a sequence of frames, and each track corresponding to a facial feature of a human, the method comprising:
   a. generating a set of feature location hypotheses applied to a plurality of images that represent the human and that are derived from the sequence of frames;
   b. refining each of the feature location hypotheses;
   c. associating a first set of confidence measures with each feature location hypothesis;
   d. associating a second set of confidence measures with interframe transitions between successive frames;
   e. optimally minimizing a cost function that is a combination of the first set of confidence measures and the second set of confidence measures over a graph of possible interframe transitions; and
   f. generating the set of tracks characterizing each of a plurality of facial features within each frame of the sequence of frames.

2. A computerized method in accordance with claim 1, wherein the first set of confidence measures associated with feature location hypotheses are represented by vertices of a connected, undirected graph, and the second set of confidence measures associated with interframe transitions are represented by edges in the connected, undirected graph.

3. A computerized method in accordance with claim 1, further comprising creating performance analysis data in a performance driven animation production pipeline based on the generated tracks.

4. A non-transitory computer readable medium for use on a computer system for storing computer-readable program code, the computer readable program code comprising:
   a. a computer code module for generating a set of feature location hypotheses applied to images derived from a sequence of frames representing images of the human;
   b. a computer code module for refining each hypothesis;
   c. a computer code module for associating a first set of confidence measures with each feature location hypothesis;
   d. a computer code module for minimizing a cost function that is a combination of hypotheses and transition confidence measures; and
   e. a computer code module for generating a set of tracks of locations characterizing each of a plurality of facial features within each frame of the sequence of frames.

* * * * *